A. S. Hart,
Faucet.
N° 26,844.    Patented Jan. 17, 1860.
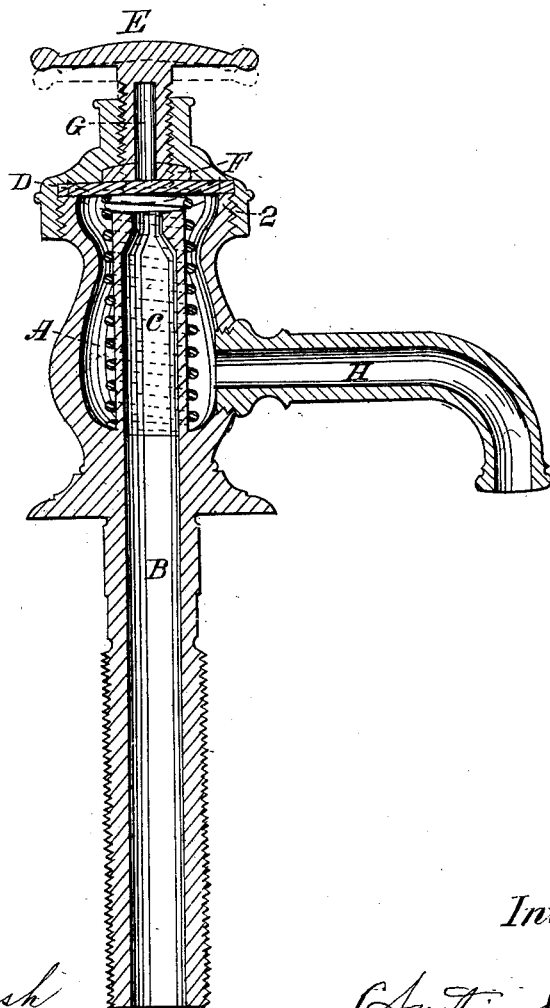
Witnesses:
W. H. Forbush
A. M. Wheeler
Inventor
Austin S. Hart

UNITED STATES PATENT OFFICE.

AUSTIN S. HART, OF BUFFALO, NEW YORK.

FAUCET.

Specification of Letters Patent No. 26,844, dated January 17, 1860.

*To all whom it may concern:*

Be it known that I, AUSTIN S. HART, of the city of Buffalo, in the county of Erie and State of New York, have invented certain new and useful Improvements in Faucets; and I do hereby declare that the following is a full and exact description of the same, reference being had to the accompanying drawings and to the letters of reference marked thereon.

The nature of my invention relates to the formation of a chamber in the main body of the faucet to receive the end of the supply pipe, and the arrangement of a spiral spring and valve within said chamber, and a thumb screw in the top and over the valve, so that the spring by its expansion will open the valve, and the thumb screw be used to close the valve and contract the spring.

(A) represents a chamber formed in the main body of the faucet and into which chamber the end of the supply pipe is received; (B) supply pipe; (C) coil spring, resting upon the bottom of the chamber (A) and surrounding the pipe (B); (D) valve—made of leather or rubber. This valve fills the circumference of the chamber and is made to fit tightly over the mouth of the pipe (B), as shown by the dotted red lines (2). It also rests upon the top of the spring (C) so that the spring will quickly raise the valve, when the pressure of the thumb screw is released; (E) thumb screw this screws into the top of the faucet and passes down to close the valve. A metal washer or intermediate valve (F) is placed between the end of the thumb screw and the rubber valve so as to prevent the thumb screw from wearing the rubber valve. A stem (G′) is attached to this metal washer, which passes up into the thumb screw (the thumb screw being bored out to receive it) so as to steady it, and keep it in its place. This washer is larger in diameter than the coil spring. By screwing down the thumb screw the valve (C) will be closed tightly upon the mouth of the pipe (B) and the coil spring will also thereby be contracted and ready to react upon the valve the moment the thumb screw is turned back and raise it from the mouth of the supply pipe and allow the water to pass into and fill the chamber (A) and flow out through the nozzle (H).

The action of this improvement is perfectly reliable under all circumstances and without any reference to the head or pressure of water, and may be used in the basement of a building where the pressure of water is great or in the garret where there is scarcely any pressure of water.

I do not claim broadly, placing a spring under the valve to raise it from its seat, irrespective of its arrangement, but What I do claim and desire to secure by Letters Patent is—

The arrangement of the spring C, valve D and pipe B, within the chamber A, and screw E, above the chamber, for the purposes and substantially as described.

AUSTIN S. HART.

Witnesses:
W. H. FORBUSH,
A. M. WHEELER.